3,499,908
PRODUCTION OF 1,3-BIS-(HETEROCYCLOIMINO)-ISOINDOLINES FROM 3-IMINOISOINDOLENINES AND HETEROCYCLIC AMINES
Heinrich Vollman, Leverkusen, and Heinrich Leister, Cologne-Stammheim, Germany, assignors to Farbenfabriken Bayer Aktiengesellschaft, Leverkusen, Germany, a corporation of Germany
No Drawing. Filed Nov. 14, 1966, Ser. No. 593,679
Claims priority, application Germany, Nov. 24, 1965, F 47,746
Int. Cl. C07d 27/48, 91/34
U.S. Cl. 260—305          15 Claims

ABSTRACT OF THE DISCLOSURE 1,3-bis-(heterocycloimino)-isoindolines are prepared by the reaction of a 3-imino-isoindolenine, which contains an easily exchangeable substituent in the 1-position, with a primary 5- or 6-membered heterocyclic amine in the presence of an acidic agent.

---

This invention relates to the production of 1,3-bis-(heterocyclo-imino)-isoindolines, and the use of the same as dyestuffs and pigments.

These compounds are obtained according to the invention by reacting a 3-imino-isoindolenine which contains an easily exchangeable substituent in the 1-position, with a primary 5- or 6-membered heterocyclic amine in the presence of an acidic agent.

Examples of the acidic agent are organic or inorganic acids or their ammonium salts. Particular ones are ammonium chloride; glacial acetic acid; formic acid; phthalic acid; phthalic anhydride; amino-sulphonic acid; alkyl- or aryl-sulphonic acids and alkyl- or aryl-sulphonic acid chlorides (e.g. benzene-sulphonic acid, toluene-sulphonic acid, chlorobenzene-sulphonic acid, benzene-sulphonic acid chloride, toluene-sulphonic acid chloride and chlorobenzene-sulphonic acid chloride); hydrogen chloride; sulphuric acid; nitric acid; and phosphoric acid.

It will generally suffice to add the acidic agent to the reaction mixture in an amount of approximately 0.05 to 0.2 mol, referred to the heterocyclic primary amine. The ammonium or immonium salts of the nitrogen bases present in the starting or reaction mixture are formed in the reaction mixture by the addition of the acidic agent.

Instead of adding the acidic agent as such, it is also possible to use, from the start, nitrogen bases which contain acidic agents, for example, in the form of 3-imino-isoindolenine nitrates or ammonium chlorides.

The easily exchangeable substituent in the 1-position of the 3-imino-isoindolenine is, for example, a mercapto or alkylmercapto group or, preferably, an alkoxy group, especially a lower alkoxy group, or an amino group.

Examples of 3-imino-isoindolenines are the following: 1-methoxy- and 1-ethoxy-3-imino-isoindolenines in the form of their addition products with 1 mol methanol or ethanol; 1-isopropoxy-3-imino-isoindolenine; 1-amino-, 1-diethylamino-, 1-piperidino- or 1-morpholino-3-imino-isoindolenine; 1-mercapto-3-imino-isoindolenine (tautomeric with 1-thio-3-imino-isoindoline); 1-methyl- or -ethyl-mercapto-3-imino-isoindolenines; 1-amino-3-imino-5- (or -6-) aza-isoindolenine; 1-amino- or 1-alkoxy-3-imino-isoindolenines which contain a methoxy, ethoxy or phenyl radical as substituents in the 5- (or 6-) position.

The heterocyclic primary amines used are preferably 5- or 6-membered heterocycles which may contain 1 to 3 N-atoms and, in addition, O- and S-atoms. An optionally substituted benzene nucleus, for example, may be fused with the heterocyclic parent nucleus.

Examples of the heterocyclic primary amines are the following: 3- (or 5-) amino-pyrazoles; 2-amino-imidazones; 2-amino-benzimidazoles; 2-amino-thiazoles, such as 2-amino-4-phenyl-thiazole, 2-amino-4-methyl-thiazole-5-carboxylic acid ethyl ester; 2-amino-benzothiazole and its 6-alkoxy derivatives; 3-amino-1,2,4-triazoles; 3-amino-1,2,4-thiadiazole; 2-amino-1,3,4-thiadiazoles and 2-amino-1,3,4-oxdiazoles, which both may be substituted, for example, in 5-position by lower alkyl radicals such as methyl-, ethyl-, propyl- or butyl-radicals or phenyl radicals which may be optionally substituted, for example, by lower alkyl radicals such as methyl-, ethyl- or propyl radicals or alkoxy radicals such as methoxy-, ethoxy- or propoxy radicals or by halogen such as chlorine or wherein the thiadiazoles or oxdiazoles are substituted by lower alkoxy radicals such as methoxy-, ethoxy-, butoxy-, cyclohexoxy or by phenoxy radicals or which are substituted by aralkyl radicals such as the benzyl radical or which contain as substitutents carbonic acid ester groups such as the carbomethoxy- or carboethoxy groups; 2-amino-pyridine; 2- and 4-amino-pyrimidines, 2-aminopyrazines, 2-amino-quinazolines; 2-amino-quinoxalines; 2-amino-1,3,5-triazines.

The reaction of the 3-imino-isoindolenines with the heterocyclic primary amines can be carried out by reacting 1 mol of the 3-imino-isoindolenine with 2 mole of the same heterocyclic primary amine or of a mixture of heterocyclic primary amines. The reaction is preferably carried out at an elevated temperature, for example, at temperatures in the range from 50 to about 200° C., preferably from 50 to 120° C. The reaction can also be carried out by performing first a partial reaction with for example, 1 mol of a heterocyclic primary amine and subsequently a second reaction with a further mol of another heterocyclic primary amine. The reaction is carried out in a medium as anhydrous as possible and in organic solvents as strongly polar as possible. Alcohols containing 1 to about 4 carbon atoms, especially methanol and ethanol, are preferred as solvents. In some cases, for example, if a very sparingly soluble product is already present after the unilateral reaction of the starting compound, the use of higher boiling polar solvents, such as formamides, pyrrolidones, pyridine, glycol or diglycol and their monoalkyl ethers, or nitrobenzene, may be expedient for the formation of bis-heterocyclo-imino derivatives. The amount of solvent is expediently so chosen—or so adjusted in the course of the reaction by distilling off part of the solvent or adding more solvent—that the reaction product is present in a still readily stirrable suspension when the reaction is completed. In the case of the lower alcohols preferably used (methanol and ethanol), 4 to 10 parts by volume are therefore used, referred to parts by weight of the 1-substituted 3-imino-isoindolenine used as starting material.

Since ammonia is always liberated in the reaction of the basic starting compounds according to the invention, the added acidic agents have the effect that the reactions always take place in an ammono-acidic system.

The process according to the invention enables the 1,3-bis(heterocyclo-imino)-isoindolines to be prepared at comparatively low temperatures with a relatively high reaction velocity, the products being obtained in a good yield and with a high degree of purity.

The 1,3-bis-imino-isoindolines obtainable according to the present process are e.g. dyestuffs for the dyeing and printing of synthetic fibres of, for example, polyesters, polyamides and cellulose triacetate and some are also of interest as pigment dyestuffs. If the dyestuffs are used for the dyeing and printing of synthetic materials, for example, materials from polyesters, polyamides or cellulose triacetate then yellow dyeings of different shades are obtained which have good to very good wet fastness sublimation fastness or thermofixation fastness. The dyestuffs generally draw better on these fibers if mixtures of the dyestuffs are used or if the dyestuffs are after-halogenated.

A new class of compounds obtainable according to the invention is of the formula

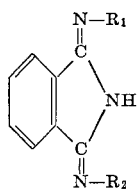

in which $R_1$ and $R_2$ each denote a heterocycle which may contain N and/or O and/or S as hetero atoms and with which an unsubstituted or substituted benzene nucleus may be fused, $R_1$ being different from $R_2$.

Certain specific new compounds according to the above formula, in which in some cases $R_1$ is the same as $R_2$, are the subject of particular claims hereinafter.

The following examples are given for the purpose of illustrating the invention, in which the parts and percentages mentioned are by weight unless otherwise stated, in which case parts by volume are related to parts by weight as are millilitres to grams.

EXAMPLE 1

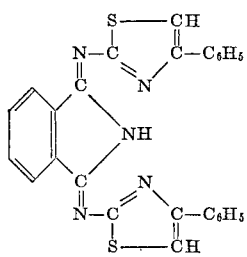

A mixture of 200 parts by volume ethanol, 25 parts of 87.1% 1-amino-3-imino-isoindolenine, 58 parts 2-amino-4-phenyl-thiazole and 3 parts ammonium chloride is boiled under reflux for 24 hours. The reaction product containing 1 mol 2-amino-4-phenyl-thiazole (1-[4'-phenyl-thiazolyl-(2')-imino]-3-imino-isoindoline) which is precipitated in the form of a yellow crystallisate when boiling temperature is reached, is converted in the course of time into the disubstitution product with the formation of orange-yellow fan-shaped needles. When the end of the reaction can be recognised by paper chromatography, the product is allowed to cool, filtered off with suction and washed with ethanol and water. The yield amounts to about 65 parts, corresponding to 94% of theory, M.P. 217 to 218° C. A sample which is recrystallised from dimethyl formamide melts at 222 to 223° C.

Without the addition of ammonium chloride but under otherwise identical working conditions there are only obtained 39.5 parts, corresponding to 57% of theory.

EXAMPLE 2

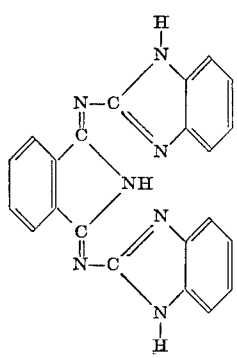

25 parts of 87.1% 1-amino-3-imino-isoindolenine, 44 parts 2-amino-benzimidazole and 3 parts ammonium chloride are introduced with stirring into 200 parts by volume ethanol. The mixture is heated at boiling temperature for 24 hours and after working up in the usual manner, there are obtained about 50 parts, corresponding to 89% of theory, of 1,3-bis-[benzimidazolyl-(2')-imino]-isoindoline in the form of yellow needles of M.P. 362 to 363° C.

Without the addition of ammonium chloride but under otherwise identical conditions there are only formed about 29 parts, corresponding to 51% of theory, which are, moreover, of poorer quality (M.P. 352 to 353° C.).

EXAMPLE 3

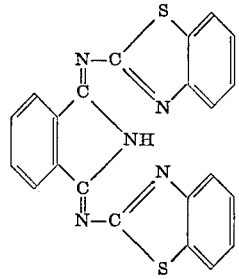

25 parts of 87.1% 1-amino-3-imino-isoindolenine, 50 parts 2-amino-benzothiazole, 3 parts ammonium chloride and 200 parts by volume ethanol are heated under reflux at boiling temperature for 24 hours, while stirring. The reaction product which crystallises in the form of uniform reddish yellow needles is filtered off with suction after cooling and washed with ethanol and water. The yield of 1,3-bis[benzothiazolyl-(2')-imino]-isoindoline is about 55 parts, corresponding to 89% of theory, M.P. 305 to 307° C. A sample which is recrystallised from dimethyl formamide melts at 312 to 314° C.

Without the addition of ammonium chloride but under otherwise identical conditions there are only formed about 15 parts of condensation product, corresponding to 48% of theory.

Similar differences in the yields obtained with and without the addition of ammonium chloride are found, when equimolar amounts of 2-amino-6-methoxy- or 2-amino-6-ethoxybenzothiazole are used (instead) of 2-amino-benzothiazole). 1,3 - bis-[6'-methoxy-benzothiazolyl-(2')-imino]-isoindoline (orange-coloured crystals of M.P. 318 to 320° C.) and 1,3-bis-[6'-ethoxy-benzothiazolyl-(2')-imino]-isoindoline (orange-coloured needles of M.P. 271 to 272° C.), respectively, are formed.

EXAMPLE 4

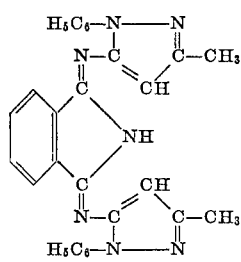

12.4 parts of 88% 1-amino-3-imino-isoindolenine, 30 parts 1-phenyl-3-methyl-5-amino-pyrazole and 1.5 parts ammonium chloride are heated in 100 parts by volume n-butanol at 118 to 120° C. for 6 hours. The butanol is subsequently driven off by steam distillation and the chromatographically homogeneous dyestuff is isolated by filtering off with suction and washing with water. Yield after drying at 80° C.: 34.5 parts, corresponding to 100% of theory. By recrystallisation from 70% acetic acid, yellow leaflets of M.P. 181 to 182° C. are obtained.

If the same reaction is carried out without the addition of ammonium chloride, the result is not a homogeneous reaction product but about 30 parts of a mixture of about 75% 1,3-bis-[1'-phenyl-3'-methyl-pyrazolyl-(5')-imino]-isoindoline and about 25% 1-[1'-phenyl-3'-methyl-pyrazolyl-(5')-imino]-3-imino-isoindoline.

EXAMPLE 5

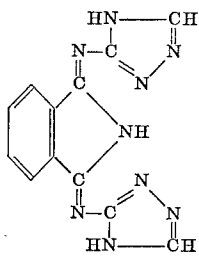

50 parts of 87.1% 1-amino-3-imino-isoindolenine, 58 parts 3-amino-1,2,4-triazole (95.6%) and 6 parts ammonium chloride are introduced with stirring into 400 parts by volume methanol. The mixture is boiled under reflux, care being taken that an exhaust gas temperature of about 60° C. is maintained. The progress of the condensation can be recognized by the gradual subsiding of the initially strong evolution of NH₃. After about 24 hours, the mixture is allowed to cool, the almost colourless crystallisate is filtered off with suction, washed with methanol and water and dried. There are obtained about 78 parts 1,3-bis-[1',2',4'-triazolyl-(3')-imino]isoindoline, corresponding to 93% of theory, M.P. about 346 to 347° C. (decomposition). The product dissolves in a methanolic sodium hydroxide solution with the addition of quinoline to give a yellow colour. A sample which is recrystallised from quinoline melts at 353 to 355° C. with decomposition.

Without the addition of ammonium chloride but under otherwise identical conditions ther are only formed 62 parts of condensation product, corresponding to 74% of theory.

EXAMPLE 6

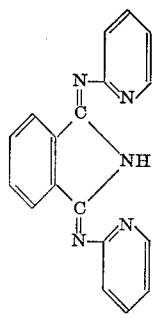

42.3 parts 1-amino-3-imino-isoindolenine of 86% purity (=36.3 parts of 100% purity=¼ mol of pure product) are heated at boiling temperature under reflux and with stirring in 100 parts by volume n-butanol with 47 parts 2-amino-pyridine (virtually pure colourless material=½ mol) in the presence of 1.25 parts ammonium chloride. Already after 3 hours, the bis-condensation product separates, still at boiling temperature, in the form of a thick crystal slurry. After 4 hours, the heating is turned off and the mixture is allowed to cool, while stirring. The product is filtered off with suction at room temperature, washed with 100 parts by volume methanol, then thoroughly with water, and dried at 95° C. Yield of virtually pure 1,3-bis(α-pyridyl-imino)-isoindoline of M.P. 186 to 187° C.: 65.5 parts, corresponding to 87.5% of the theoretical amount of 74.8 parts, referred to each of the two starting compounds.

(b) From the same mixture, but without the addition of ammonium chloride, the resultant condensation product separates in the form of yellow needles only upon cooling. Working up as under (a) leads to a final product of approximately the same quality, but gives only a yield of 49.5 parts by weight, corresponding to 66% of theory.

(c) Further reaction examples for the same starting components, but with other alcohols and with acidic additives which differ with regard to type and amount, are summarised in the following table. In each case there are used 400 parts by volume of the alcohol concerned, 1 mol of 100% 1-amino-3-imino-isoindolenine in the form of technical material and 2 mol of virtually pure 2-aminopyridine. The yields refer in all cases to pure material of M.P. 186 to 187° C. When low-boiling alcohols with a relatively high solubilizing power for ammonia are used, the temperature of the cooling water in the reflux condenser is maintained at such a level that the temperature of the escaping ammonia lies about 10 to 15° below the boiling temperature of the alcohol used.

| Solvent | Additive (amount and type) | Reaction time, hours | Yield as percent of theory |
|---|---|---|---|
| Methanol | 5 parts ammonium chloride | 24 | 92 |
| Do | 23 parts ammonium sulphate | 24 | 82 |
| Do | 14 parts ammonium nitrate | 24 | 87.5 |
| Do | 23 parts diammonium hydrogen phosphate | 23.5 | 70 |
| Do | 10 parts glacial acetic acid | 24 | 89.5 |
| Ethanol | 18 parts glacial acetic acid | 12 | 84.8 |
| Do | 10 parts glacial acetic acid | 12 | 94 |
| Methanol | 20 parts phthalic anhydride | 24 | 93 |
| Do | 20 parts p-toluene-sulphonic acid | 23.5 | 91.5 |
| Isopropanol | 5 parts ammonium chloride | 12 | 88 |
| Do | Without addition | 12 | 23 |
| Do | do | 24 | 43 |

EXAMPLE 7

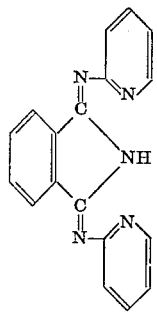

135 parts of technical phthalic acid dinitrile (95% purity) are introduced into 200 parts by volume methanol and a solution of 5 parts sodium in 200 parts by volume methanol is added. The reaction mixture is stirred at 20° C. for 15 minutes and 188 parts 2-amino-pyridine are then introduced. The mixture is stirred below 30° C. for about 3 hours, whereby the phthalodinitrile is quantitatively converted, in a slightly exothermic reaction, into 1,1-dimethoxy-3-imino-isoindoline which crystallises in part. Without isolating this product, 21.4 parts ammonium chloride are added, the mixture is heated to boiling temperature in the course of 1 hour and boiled under reflux for about 20 to 22 hours. After cooling, the product is filtered off with suction and washed with methanol and water. There are obtained about 271 to 272 parts 1,3-bis-(α-pyridyl-imino)-isoindoline, corresponding to 91% theory, M.P. 186 to 187° C.

EXAMPLE 8

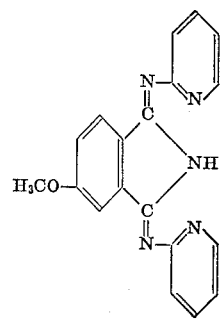

35 parts of 82.5% 1-amino-3-imino-5- (or -6-) methoxy-isoindolenine, 37.6 parts 2-amino-pyridine, 100 parts by volume methanol and 4 parts ammonium chloride are boiled under reflux for 24 hours, the temperature of the cooling water being maintained at about 60° C. The pale yellow crystallisate is filtered off with suction after cooling and washed with methanol and water. The yield is about 45 parts, corresponding to 83% of theory, M.P. 179 to 180° C. The product is more readily soluble in hydrocarbons than is the 1,3-bis-pyridyl-imino-isoindoline which is not substituted by methoxy.

If the reaction is carried out in the same manner but without the addition of ammonium chloride, then only 28 parts of condensation product are obtained, corresponding to 51.5% of theory.

EXAMPLE 9

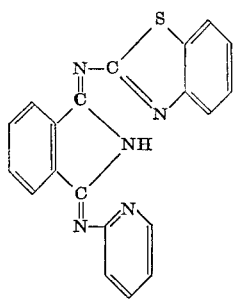

16.7 parts of 87.1% 1-amino-3-imino-isoindolenine, 15 parts 2-amino-benzothiazole and 1 part ammonium chloride are introduced into 130 parts by volume ethanol and the reaction mixture is stirred at 60° C. for 6 to 7 hours, whereby 1 - [benzothiazolyl-(2')-imino]-3-imino-isoindoline (M.P. 303 to 305° C. with decomposition) is formed. Without isolating this product, 9.4 parts 2-amino-pyridine are added, the mixture is heated at 60° C. for another 2 hours and boiled under reflux for about 15 hours. Yield: 29.5 parts 1-[benzothiazolyl-(2')-imino]-3-[pyridyl-(2')-imino]-isoindoline, corresponding to 83% of theory, M.P. 198 to 200° C.

Without the addition of ammonium chloride, this method yields no pure final product but about 17 parts of a mixture melting at 268 to 271° C. and consisting of the compound of asymmetrical structure described above and 1,3-bis-[benzothiazolyl-(2')-imino]-isoindoline.

EXAMPLE 10

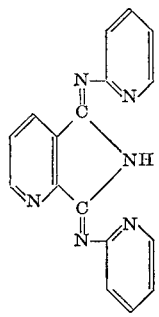

The 1,1 - dimethoxy-3-imino-4-(or -7-)-aza-isoindoline used as starting material is prepared by introducing 19.4 parts pyridine-2,3-dicarboxylic acid dinitrile into 50 parts by volume methanol and adding a solution of 0.75 part sodium in 50 parts by volume methanol, while cooling with ice-water. When the weakly exothermic reaction has subsided, 28.2 parts 2-amino-pyridine are added, the mixture is stirred at room temperature for one hour, 3.3 parts ammonium chloride are added and the mixture is brought to the boil in the course of one hour. The reaction mixture is boiled under reflux for 15 hours, carefully diluted with 350 parts of water after cooling, the 1,3-bis-(α-pyridyl-imino)-4-aza-isoindoline which crystallises in the form of yellow needles is filtered off with suction and washed with water. Yield about 30 parts of M.P. 178 to 179° C.

EXAMPLE 11

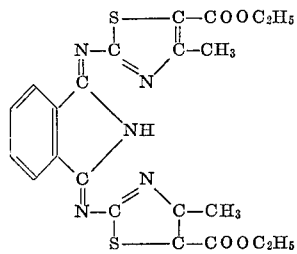

16.5 parts of 88% 1-amino-3-imino-isoindolenine, 200 parts by volume isobutanol, 40 parts 2-amino-4-methyl-5-carbethoxy-thiazole and 2 parts ammonium chloride are heated under reflux for 8 hours. The yellow crystallisate which increasingly separates in the course of the reaction, is filtered off with suction after cooling and washed with methanol and water. The yield of chromatographically pure diester is about 40 parts, corresponding to 83% of theory, M.P. about 233 to 235° C. By recrystallisation from dimethyl formamide, yellow needles of M.P. 241 to 242° C. are obtained.

Without the addition of ammonium chloride, but under otherwise completely identical conditions, there are obtained about 37 parts of a mixture melting at 204 to 208° C. and consisting of about 70% 1,3-bis-[4'-methyl-5'-carbethoxy-thiazolyl-(2')-imino]-isoindoline and about 30% 1 - [4'-methyl-5'-carbethoxy-thiazolyl-(2')-imino]-3-imino-isoindoline.

EXAMPLE 12

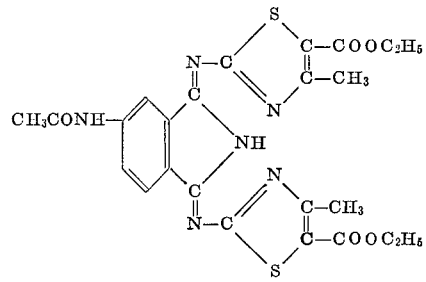

10 parts 1-amino-3-imino-5-acetamino-isoindolenine, 19 parts 2-amino-4-methyl-5-carbethoxy-thiazole and 1 part ammonium chloride are heated in 100 parts by volume isobutanol under reflux for 12 hours, while stirring. After cooling, the product is filtered off with suction and washed with methanol and water. The reaction product is obtained in the form of yellow needles of M.P. 311 to 312° C.

EXAMPLE 13

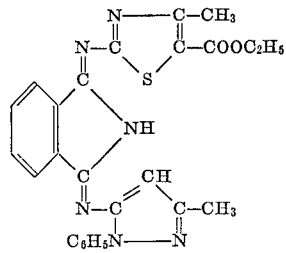

24.8 parts of 88% 1-amino-3-imino-isoindolenine, 28 parts 2-amino-4-methyl-5-carbethoxy-thiazole, 27 parts 1-phenyl-3-methyl-5-amino-pyrazole and 3 parts ammonium chloride are introduced into 200 parts by volume isobutanol and the mixture is stirred at 60 to 70° C. for one hour and at 108 to 110° C. for 12 hours. The chromatographically homogeneous yellow reaction product is isolated in the usual manner. Yield: about 51 to 52 parts of M.P. 202 to 204° C.

EXAMPLE 14

(a)

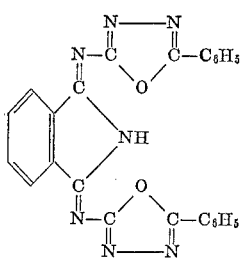

A mixture of 4.1 parts of 88% 1-amino-3-imino-iso-indolenine, 8.5 parts 2-amino-5-phenyl-1,3,4-oxdiazole, 40 parts by volume n-butanol and 0.5 part ammonium chloride is stirred at 118 to 120° C. for 12 hours. After working up in the usual manner there are obtained about 9 parts 1,3-bis - [5'-phenyl - 1',3',4'-oxdiazolyl - (2')-imino]-isoindoline, corresponding to 83% of theory, M.P. 315 to 316° C. The compound crystallises from dimethyl formamide in the form of yellow needles of M.P. 319 to 320° C.

(b) Corresponding yellow dyeing dyestuffs are obtained if instead of the 2-amino-5-phenyl-1,3,4-oxdiazole there are used equivalent amounts of the following compounds: 2-amino - 1,3,4-oxdiazole, 2-amino - 5-methyl-1,3,4-oxdiazole, 2-amino - 5-ethyl - 1,3,4-oxdiazole, 2-amino - 5-n-butyl - 1,3,4-oxdiazole, 2-amino-5 - (p-toluyl - 1,3,4-oxdiazole, 2-amino - 5-xylyl - 1,3,4-oxdiazole, 2-amino - 5-(m-anisyl) - 1,3,4-oxdiazole, 2-amino-5-(p-anisyl) - 1,3,4 - oxdiazole, 2-amino - 5-(m-chlor-phenyl)-1,3,4 - oxdiazole, 2 - amino-5-(p - chlor-phenyl) - 1,3, 4-oxdiazole, 2 - amino-5-methoxy - 1,3,4 - oxdiazole, 2-amino - 5-ethoxy-1,3,4 - oxdiazole, 2-amino-5 - phenoxy- 1,3,4 - oxdiazole, 2-amino - 5-benzyl - 1,3,4 - oxdiazole, 2-amino - 5-carbomethoxy - 1,3,4 - oxdiazole, 2-amino-5-carbethoxy-1,3,4-oxdiazole.

EXAMPLE 15

(a)

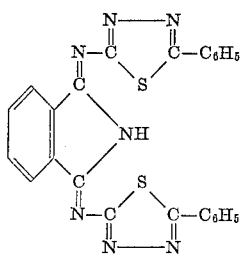

8.2 parts of 88% 1-amino - 3-imino-isoindolenine, 19 parts 2-amino-5-phenyl-1,3,4-thiadiazole, 180 parts by volume butanol and 0.5 part glacial acetic acid are heated at 118 to 120° C. for 18 hours while stirring. The reaction mixture is then allowed to cool, the 1,3-bis-[5'-phenyl-1',3',4' - thiadiazolyl-(2') - imino]-isoindoline which crystallises out in the form of yellow needles is filtered off with suction and washed with methanol. The yield amounts to about 19 parts, corresponding to 82% of theory, the product melts at 271 to 273° C.

(b) Corresponding yellow dyeing dyestuffs are obtained if instead of the 2-amino-5-phenyl-1,3,4-thiadiazole there are used equivalent amounts of the following compounds: 2-amino - 1,3,4 - thiadiazole, 2-amino - 5-methyl - 1,3,4-thiadiazole, 2-amino - 5-ethyl-1,3,4 - thiadiazole, 2-amino-5-n-butyl - 1,3,4 - thiadiazole, 2-amino - 5-(p-toluyl) - 1,3,4 - thiadiazole, 2-amino - 5-xylyl - 1,3,4 - thiadiazole, 2-amino - 5-(m-anisyl) - 1,3,4 - thiadiazole, 2-amino-5- (p-anisyl) - 1,3,4 - thiadiazole, 2-amino - 5-(m-chlor-phenyl) - 1,3,4-thiadiazole, 2-amino - (p-chlor - phenyl)- 1,3,4 - thiadiazole, 2-amino - 5-methoxy - 1,3,4 - thiadiazole, 2-amino - 5-ethoxy - 1,3,4 - thiadiazole, 2-amino-5-n-butoxy-1,3,4-thiadiazole, 2-amino - 5-cyclohexoxy - 1, 3,4-thiadiazole, 2-amino - 5-phenoxy - 1,3,4-thiadiazole, 2-amino - 5-benzyl - 1,3,4-thiadiazole, 2-amino - 5-carbomethoxy - 1,3,4-thiadiazole, 2-amino - 5-carbethoxy-1, 3,4-thiadiazole.

EXAMPLE 16

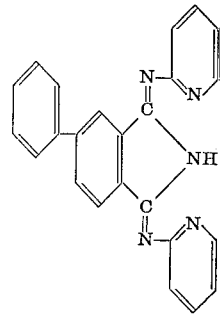

The 1,1 - dimethoxy-3-imino - 5-(or -6-)phenyl isoindoline used as starting material is prepared by adding a solution of 0.75 part sodium in 50 parts by volume methanol to a solution of 30.6 parts 3,4-dicyano-diphenyl in 50 parts by volume methanol and stirring at 40 to 50° C. for about 2 hours. Without isolation, 28.2 parts 2-aminopyridine and 3.3 parts ammonium chloride are added and the mixture is heated under reflux for 20 hours. Upon concentration of the methanolic solution, 1,3-bis-(α-pyridyl-imino)-5-phenyl-isoindoline (M.P. about 151 to 153° C.) crystallises out. A sample which is recrystallised from acetone melts at 158 to 159° C.

EXAMPLE 17

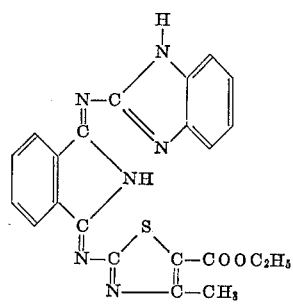

A mixture of 8.2 parts of 88% 1-amino-3-imino-iso-indolenine, 9.3 parts 2 - amino-4-methyl - 5-carbethoxy-thiazole, 6.7 parts 2-amino-benzimidazole, 1 part ammonium chloride and 130 parts by volume isobutanol is heated, while stirring, at 60 to 70° C. for 2 hours and at 110° C. for 12 hours. The reaction mixture is allowed to cool, the orange-yellow crystallisate is filtered off with suction and washed with methanol and water. About 19 parts 1-[benzimidazolyl - (2')-imino] - 3-[4'-methyl-5'-carbethoxy-thiazolyl - (2')-imino] - isoindoline are obtained, corresponding to 88.5% of theory, M.P. 250 to 253° C.

Without the addition of ammonium chloride, the reaction product obtained by this method of operation contains large amounts of 1,3-bis - [benzimidazolyl - (2')-imino]- and 1,3-bis - [4'-methyl-5' - carbethoxy - thiazolyl-(2')-imino]-isoindoline.

EXAMPLE 18

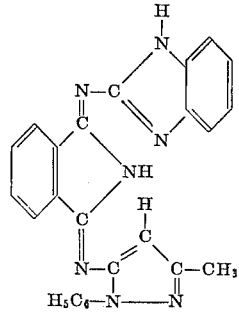

16.5 parts of 88% 1-amino - 3-imino-isoindolenine, 13.3 parts 2-amino-benzimidazole, 17.3 parts 1-phenyl-3-methyl-5-amino-pyrazole, 2 parts ammonium chloride and 120 parts by volume ethanol are heated at 80° C. for 18 hours while stirring. The distribution product has then 120 to 130° C. for 2 hours. The material is subsequently rinsed and dried. A clear yellow dyeing of very good fastness to sublimation and light is obtained.

The following dyeings are obtained, when the dyestuffs stated below are used:

| Dyestuff | Dyeing | Fastness to sublimation | Fastness to light |
|---|---|---|---|
| 1-[benzimidazolyl-(2')-imino]-3[4'-methyl-5'-carbethoxythiazolyl-(2')-imino]-isoindoline (Example 17). | Reddish yellow | Very good | Very good. |
| 1,3-bis-[5'-phenyl-1',3',4'-oxdiazolyl-(2)-imino]-isoindoline (Example 14a). | Yellow | do | Do. |
| 1,3-bis-[5'-phenyl-1',3',4'-thiadiazolyl-(2')-imino]-isoindoline (Example 15a). | Reddish yellow | do | Excellent. |
| 1,3-bis-[5'-(p-toluyl)-1',3',4'-oxdiazolyl-(2')-imino]-isoindoline (Example 14b). | Yellow | do | Very good. |
| 1,3-bis-[5'-(p-toluyl)-1',3',4'-thiadiazolyl-(2')-imino]-isoindoline (Example 15b). | Reddish yellow | do | Do. |
| 1,3-bis-[5'-xylyl-1',3',4'-oxdiazolyl-(2')-imino]-isoindoline (Example 14b). | Yellow | do | Do. |
| 1,3-bis-[5'-xylyl-1',3',4'-thiadiazolyl-(2')-imino]-isoindoline (Example 15b). | do | do | Do. |
| 1,3-bis-[5'-(m-anisyl)-1',3',4'-oxdiazolyl-(2')-imino]-isoindoline (Example 14b). | Reddish yellow | do | Do. |
| 1,3-bis-[5'-(p-anisyl)-1',3',4'-thiadiazolyl-(2')-imino]-isoindoline (Example 15b). | do | do | Do. |
| 1,3-bis-[5'-(m-chlor-phenyl)-1',3',4'-oxdiazolyl-(2')-imino]-isoindoline (Example 14b). | Yellow | do | Do. |
| 1,3-bia-[5'-(p-chlor-phenyl)-1',3',4'-thiadiazolyl-(2')-imino]-isoindoline (Example 15b). | do | do | Do. |
| 1,3-bis-[5'-phenoxy-1',3',4'-oxdiazolyl-(2')-imino]-iso-indoline (Example 14b). | Reddish yellow | do | Do. |
| 1,3-bis-[5'-phenoxy-1',3',4'-thiadiazolyl-(2')-imino]-isoindoline (Example 15b). | do | do | Do. |
| 1,3-bis-[5'-benzyl-1',3',4'-oxdiazolyl-(2')-imino]-isoindoline (Example 14b). | Yellow | do | Do. |
| 1,3-bis-[5'-benzyl-1',3',4'-thiadiazolyl-(2')-imino]-isoindoline (Example 15b). | do | do | Do. | formed in the shape of yellow needles. The product is filtered off with suction after cooling, washed with methanol and water, and, after drying, about 29 parts 1-[benzimidazolyl - (2')-imino] - 3-[1'-phenyl-3'-methyl-pyrazolyl-(5')-imino]-isoindoline are obtained, corresponding to 70% of theory.

EXAMPLE 19

(a) In a bath consisting of 600 parts of water, 0.1 part of finely divided 1-[benzimidazolyl - (2')-imino]-3-[4'-methyl - 5'-carbethoxy - thiazolyl - (2')-imino]-isoindoline (Example 17), 3.4 parts of a mixture of o-, m- and p-cresotic acid methyl ester and 0.6 part of a mixture of equal parts of an aralkyl-sulphonate and a non-ionic polyglycol ether, 10 parts of skein material made of polyethylene glycol terephthalate are dyed, after adding sulphuric acid until a pH value of 4.5 has been adjusted, at 96 to 98° C. for two hours. The material is then rinsed and dried. A clear reddish yellow dyeing of very good fastness to sublimation and light is obtained.

In an analogous manner but with the use of 1-[4'-methyl - 5'-carbethoxy-thiazolyl-(2')-imino]-3-[1'-phenyl-3' - methyl-pyrazolyl-(5')-imino]-isoindoline (Example 13), a greenish yellow dyeing of very good fastness to washing and light and good fastness to sublimation is obtained. 1,3 - bis - [5'-phenyl-1',3',4'-thiadiazolyl-(2')-imino]-isoindoline (Example 15) gives reddish yellow dyeings of excellent fastness to light and sublimation. Very clear strong yellow dyeings with good general fastness properties are obtained if in analogous manner there are used: 1,3 - bis[5'-carbomethoxy-1',3',4'-oxdiazolyl-(2')-imino]-isoindoline (Example 14b), 1,3-bis-[5'-carbethoxy - 1',3',4'-oxdiazolyl-(2')-imino]-isoindoline (Example 14b), 1,3-bis-[5'-carbmethoxy-1',3',4'-thiadiazolyl-(2')-imino]-isoindoline (Example 15b), 1,3-bis-[5'-carbethoxy-1',3',4'-thiadiazolyl-(2')-imino]-isoindoline (Example 15b).

(b) In a bath at pH 4.5 consisting of 400 parts of water, 0.15 part of very finely divided 1,3-bis-[4'-methyl-5'-carbethoxy-thiazolyl-(2')-imino]-isoindoline (Example 11) and 0.3 part of a mixture of equal parts of an aralkyl-sulphonate and a non-ionic polyglycol ether, 10 parts of flakes of polyethylene glycol terephthalate are dyed at (c) A fabric of polyester fibre material produced from terephthalic acid and 1,4-bis-hydroxymethyl-cyclohexane is impregnated on a foulard with a liquor containing, in 1000 parts of water, 20 parts of finely divided 1,3-bis-[4' - methyl-5'-carbethoxy-thiazolyl-(2')-imino]-isoindoline (Example 11) and 10 parts of a conventional thermosol auxiliary, particularly a polyethylene ether. The fabric is then squeezed to a weight increase of 70% and dried at 80 to 120° C. It is subsequently treated with hot air at 180 to 220° C. for about 45 seconds, rinsed, subjected to a reductive after-treatment, if desired, and dried. A clear yellow dyeing of very good fastness to rubbing, sublimation and light is obtained, the dyestuff yield being almost 100%.

In an analogous manner, 1-[4'-methyl-5'-carbethoxythiazolyl - (2')-imino]-3-[1'-phenyl-3'-methyl - pyrazolyl-(5')-imino]-isoindoline (Example 13) gives a clear greenish yellow dyeing of very good fastness to rubbing and sublimation and excellent fastness to light. Yellow dyeings with similar fastness properties are obtained if the reaction products of 1 mol 1-amino-3-imino-isoindolenine and 2 mols of any of the following amines are used: 2-amino-1,3,4-oxdiazole (Example 14b), 2-amino-1,3,4-thiadiazole (Example 15b), 2-amino-5-methyl-1,3,4-oxdiazole (Example 14b), 2-amino-5-ethyl- and -5-n-butyl-1,3,4-thiadiazole (Example 15b), 2-amino-5-methoxy- and -5-ethoxy-1,3,4-oxdiazole (Example 14b), 2-amino-5-methoxy-, -5-ethoxy-, -5-n-butoxy- and -5-cyclohexoxy-1,3,4-thiadiazole (Example 15b).

(d) In a bath containing, in 400 parts of water, 0.2 part of finely divided 1-[4'methyl-5'-carbethoxy-thiazolyl-(2')-imino]-3-[1'phenyl-3'-methyl-pyrazolyl-(5')-imino]-isoindoline (Example 13) and 0.2 part of a conventional dispersing agent, 10 parts skein material made of a polyamide (produced by polymerisation of caprolactam) are slowly heated to boiling temperature and dyed at the boil for 1 hour. A yellow dyeing of very good fastness to washing and water is achieved.

(e) When in Example 19(a) the fabric made of polyester material is replaced with cellulose triacetate, the dyestuff obtained according to Example 17 yields a clear yellow dyeing.

EXAMPLE 20

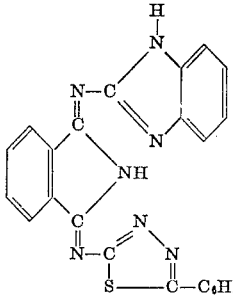

A mixture of 8.3 parts of 88% 1-amino-3-imino-isoindolenine, 6.65 parts 2-amino-benzimidazole, 120 parts by volume isobutanol and 0.5 part ammonium chloride is stirred at 70° C. for 3 hours, whereby 1-[benzimidazolyl-(2')-imino]-3-imino-isoindoline (M.P. 350 to 354° C. with decomposition) is formed. Without isolating this product, 8.9 parts 5-amino-2-phenyl-1,3,4-thiadiazole are added and heating is continued at 70° C. for one hour and then at 110° C. for 20 hours. Yield after working up as usual: 17 parts 1-[benzimidazolyl-(2')-imino]-3-[2'-phenyl - 1',3',4'-thiadiazolyl-(5')-imino]-isoindoline, corresponding to 81% of theory. Orange-yellow needles of M.P. 293 to 294° C. Polyester fibres are dyed according to Examples 19a and 19b in intense yellow shades of very good fastness to sublimation and light.

EXAMPLE 21

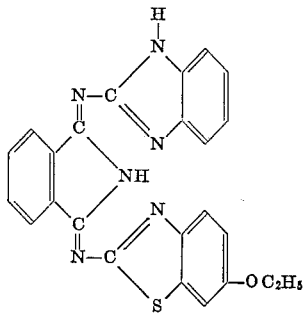

The monosubstitution product is prepared as in Example 20 at 70° C. from 8.3 parts of 88% 1-amino-3-imino-isoindolenine, 6.65 parts 2-amino-benzimidazole, 0.5 part ammonium chloride and 70 parts by volume isobutanol. 9.7 parts 2 - amino-6-ethoxy-benzothiazole are then added and stirring is continued at 70° C. for one hour and at 110° C. for 25 hours. The reaction product of the above structural formula crystallises in the form of orange-coloured needles of M.P. 312 to 313° C. About 18 parts are obtained, corresponding to 82% of theory. Material made of polyester fibres is dyed according to Example 19c in orange-yellow shades of very good fastness to sublimation and light.

EXAMPLE 22

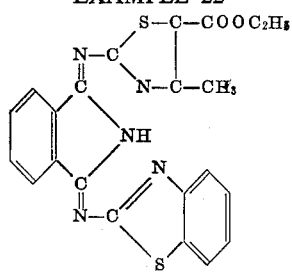

8.3 parts of 88% 1-amino-3-imino-isoindolenine, 9.3 parts 2-amino-4-methyl-5-carbethoxy-thiazole, 0.5 part ammonium chloride and 120 parts by volume isobutanol are stirred at 70° C. for about 3 hours. When 1-[4'-methyl-5'-carbethoxy-thiazolyl-(2')-imino]-3-imino - isoindoline (M.P. 212 to 214° C. with decomposition) has formed, there are added, without isolating this product, 7.5 parts 2-amino-benzothiazole, and heating is continued at 70° C. for one hour and then at 110° C. for 7 hours. The reaction product of the above structural formula which crystallises out in the form of yellow needles (M.P. 199 to 201° C., yield 21 parts, corresponding to 94% theory) dyes polyester fibres according to Examples 19a and 19b with very good affinity in clear yellow shades of good fastness to sublimation and light.

By process similar to that described in Example 20, the 1-[4'-methyl-5'-carbethoxy-thiazolyl-(2') - imino]-3-imino-isoindoline obtained as monoreaction product can also be reacted with other heterocyclic amines, instead of with 2-amino-benzothiazole, as can be seen from the following table:

| Example | Heterocyclic amine | Yield, (percent) | M.P. (° C.) | Accord. Example | Dyeing to shade |
|---|---|---|---|---|---|
| 23 | 2-amino-6-ethoxy-benzothiazole. | 89 | 228-230 | 19(b), 19(c) | Yelolw orange. |
| 24 | 5-amino-2-phenyl-1,3,4-thiadiazole. | 78 | 244-247 | 19(a), 19(b) | Yellow. |

EXAMPLE 25

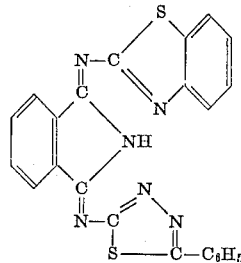

8.3 parts of 88% 1-amino-3-imino-isoindolenine, 7.5 parts 2-amino-benzothiazole, 0.5 part ammonium chloride and 130 parts by volume isobutanol are stirred at 70° C. for 3 to 4 hours, whereby 1-[benzothiazolyl-(2')-imino]-3-imino-isoindoline is formed (cf. Example 9). Without isolating this product, 8.9 parts 5-amino-2-phenyl-1,3,4-thiadiazole are added and heating is continued at 70° C. for one hour and then at 110° C. for 24 hours. About 17 parts 1- benzothiazolyl-(2')-imino] - 3 - [2'-phenyl-1',3',4'-thiadiazolyl-(5')-imino]-isoindoline are obtained, corresponding to 78% of theory. Yellow needles of M.P. 255 to 260° C. The dyestuff dyes polyester fibres according to Examples 19a and 19b in clear yellow shades of good fastness to sublimation and light.

EXAMPLE 26

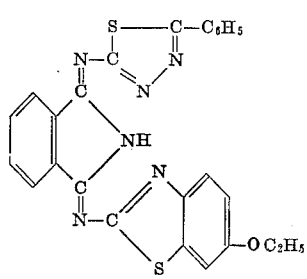

8.3 parts of 88% 1-amino-3-imino-isoindolenine, 8.9 parts 5-amino-2-phenyl-1,3,4 - thiadiazole, 0.5 part ammonium chloride and 70 parts by volume isobutanol are heated at 70° C. for 3 hours, while stirring, whereby 1-[2'-phenyl-1'3',4'-thiadiazolyl-(5')-imino] - 3 - imino-isoindoline (M.P. 246 to 247° C.) is obtained. Without isolating this product, 9.7 parts 2-amino-6-ethoxy-benzothiazole are added and stirring is continued at 70° C. for one hour and then at 110° C. for 24 hours. After working up as usual, about 19 parts 1-[2'-phenyl-1',3',4'-thiadiazolyl-(5')-imino] - 3 - [6'-ethoxy-benzothiazolyl-(2')-imino]-isoindoline are obtained, corresponding to 79% of theory. The dyestuff (orange-yellow narrow leaflets of M.P. 279 to 281° C.) dyes material made of polyester fibres according to Example 19c in yellow-orange shades.

EXAMPLE 27

6.6 parts of 88% 1-amino-3-imino - isoindolenine, 2.2 parts of 81% 1-amino-3-imino - 5 - (respectively 6)-methoxy-isoindolenine, 19 parts of 2 - amino-5-phenyl-1,3,4-thiadiazole, 180 parts by volume of butanol and 0.5 part of acetic acid are heated for 20 hours to 118 to 120° while stirring. Thereafter the reaction mixture is worked up in the usual manner and there is obtained a mixture consisting of about 80% of 1,3-bis-[5'-phenyl-1',3',4'-thiadiazolyl-(2')-imino] - isoindoline and about 20% of 1,3-bis-[5'-phenyl - 1',3',4' - thiadiazolyl - (2')-imino]-5-methoxy-isoindoline. Yield about 85% of the theoretical. This dyestuff mixture dyes the polyester fibre materials according to the process of Example 19c yellow and the dyeings have excellent sublimation fastness, rubbing fastness and light fastness.

A dyestuff mixture of similar good dyeing properties and with similar good fastness properties is obtained if instead of a 1-amino-3-imino-5-(respectively 6)-methoxy-isoindolenine 2.5 parts of a 90% 1-amino-3-imino-5-(respectively 6)-phenyl-isoindolenine is used or if instead of 19 parts 2-amino-5-phenyl-1,3,4-thiadiazole a mixture of 17 parts of 2-amino-5-phenyl-1,3,4-thiadiazole and 2 parts of 2-amino-5-phenyl-1,3,4-oxdiazole is used.

EXAMPLE 28

4.7 parts of 1,3-bis-[5'-phenyl-1',3',4'-thiadiazolyl-(2')-imino]-isoindoline (obtained according to Example 15a) is dissolved in 50 parts by volume of pyridine and subsequently there are added dropwise 0.4 part of bromine at room temperature while stirring. The mixture is thereafter stirred for another hour and then poured into 500 parts of water. The reaction product is filtered off and washed with water. It contains about 3.5% of bromine. This dyestuff used for the dyeing according to Examples 19a and 19b draws better on polyester fibre than the starting dyestuff.

What we claim is:

1. In the process for the production of 1,3-bis-(heterocycloimino)-isoindolines which comprises reacting a 3-imino-isoindolenine containing in the 1-position an easily exchangeable substituent selected from amino, alkoxy, mercapto, and alkyl mercapto with a primary 5- or 6-membered quasi-aromatic heterocyclic amine containing 1–3 nitrogen atoms and optionally an oxygen or sulfur atom, the improvement which comprises conducting said reacting in the presence of an acidic agent selected from ammonium chloride, glacial acetic acid, formic acid, phthalic acid, phthalic anhydride, aminosulfonic acid, alkyl-sulfonic acid, aryl-sulfonic acid, alkyl-sulfonic acid chloride, aryl-sulfonic acid chloride, hydrogen chloride, sulphuric acid, nitric acid and phosphoric acid.

2. The process of claim 1 in which said primary heterocyclic amine is selected from amino-pyrazoles, amino-imidazoles amino-benzimidazoles, amino-thiazoles, amino-benzothiazoles, amino-triazoles, amino-thiadiazoles, amino-oxdiazoles, amino-pyridines, amino-pyrimidines, amino-pyrazines, amino-quinazolines, amino-quinoxalines, and amino-triazines.

3. Process according to claim 1 in which the acidic agent is ammonium chloride.

4. Process according to claim 1 in which the acidic agent is anhydrous acetic acid.

5. Process according to claim 1 in which the acidic agent is initially present in combination with the nitrogenous base starting material.

6. Process according to claim 1 in which the heterocyclic primary amine has an unsubstituted or substituted benzene nucleus fused with the heterocyclic nucleus.

7. Process according to claim 1 in which 1 mol of the 3-imino-isoindolenine is reacted with 2 mols of the heterocyclic primary amine.

8. Process according to claim 1 in which 1 mol of the 3-imino-isoindolenine is reacted with 1 mol of a heterocyclic primary amine and the reaction is completed with 1 mol of a different heterocyclic primary amine.

9. Process according to claim 1 in which the reaction is carried out in a solvent medium.

10. Process according to claim 9 in which the solvent is a lower primary or secondary alcohol with a boiling point up to about 120° C.

11. Compound of the formula

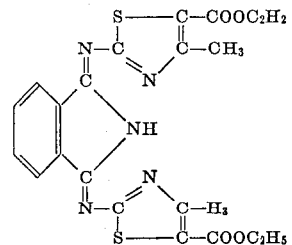

12. Compound of the formula

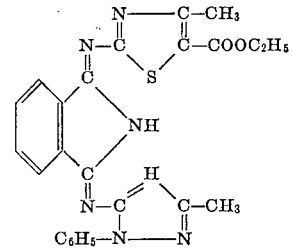

13. Compound of the formula

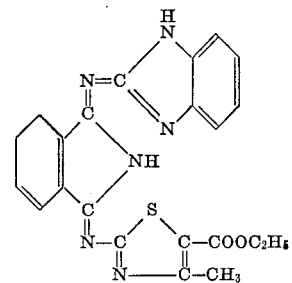

14. Compound of the formula

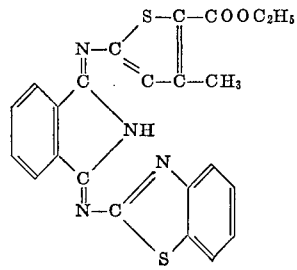

15. Compound of the formula
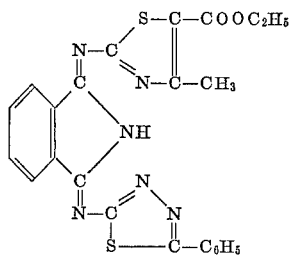
References Cited
UNITED STATES PATENTS
3,190,835   6/1965   Smithuysen et al. ____ 260—306.8
ALEX MAZEL, Primary Examiner
R. J. GALLAGHER, Assistant Examiner
U.S. Cl. X.R.
106—193; 260—306.8, 310, 301, 309.2, 308, 307, 296, 294.8, 256.4, 250, 249.5, 40, 37, 247.1